US010864892B2

(12) United States Patent
Hashizume et al.

(10) Patent No.: US 10,864,892 B2
(45) Date of Patent: Dec. 15, 2020

(54) ANTI-THEFT APPARATUS AND OUTBOARD MOTOR ANTI-THEFT SYSTEM

(71) Applicant: HONDA MOTOR CO., LTD., Tokyo (JP)

(72) Inventors: Takashi Hashizume, Wako (JP); Manabu Dobashi, Wako (JP); Tetsuya Matsuhisa, Wako (JP); Ryota Hisada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/722,449

(22) Filed: Dec. 20, 2019

(65) Prior Publication Data

US 2020/0216029 A1    Jul. 9, 2020

(30) Foreign Application Priority Data

Jan. 9, 2019    (JP) ................................. 2019-002094

(51) Int. Cl.
| B60R 25/34 | (2013.01) |
| B60R 25/10 | (2013.01) |
| F02D 45/00 | (2006.01) |
| F02D 35/00 | (2006.01) |
| B63H 21/30 | (2006.01) |

(52) U.S. Cl.
CPC .......... B60R 25/34 (2013.01); B60R 25/1004 (2013.01); B63H 21/30 (2013.01); F02D 35/00 (2013.01); F02D 45/00 (2013.01)

(58) Field of Classification Search
CPC ..... B60R 25/34; B60R 25/1004; B63H 21/30; F02D 35/00; F02D 45/00
See application file for complete search history.

(56) References Cited

U.S. PATENT DOCUMENTS

| 4,849,738 A * | 7/1989 | Forti .................. G08B 13/1454 340/984 |
| 8,357,018 B2 | 1/2013 | Takeda et al. |
| 2011/0136398 A1 | 6/2011 | Takeda et al. |

FOREIGN PATENT DOCUMENTS

JP    2011-122331 A    6/2011

* cited by examiner

*Primary Examiner* — Brian A Zimmerman
*Assistant Examiner* — Kevin Lau
(74) *Attorney, Agent, or Firm* — Thomas Horstemeyer, LLP

(57) ABSTRACT

An anti-theft apparatus for an outboard motor that can be mounted on a boat, comprising a comparison unit configured to compare a vibration of the outboard motor with a vibration of a portion of the boat other than the outboard motor, and a notification unit configured to make a predetermined notification based on a comparison result by the comparison unit.

11 Claims, 8 Drawing Sheets

# ANTI-THEFT APPARATUS AND OUTBOARD MOTOR ANTI-THEFT SYSTEM

CROSS-REFERENCE TO RELATED APPLICATION(S)

This application claims priority to and the benefit of Japanese Patent Application No. 2019-002094 filed on Jan. 9, 2019, the entire disclosure of which is incorporated herein by reference.

BACKGROUND OF THE INVENTION

Field of the Invention

The present invention relates to an anti-theft apparatus mainly for an outboard motor.

Description of the Related Art

Some of boats travel on the water by generating a propulsive force using the power of an outboard motor attached to a hull. For these boats, the outboard motor may be detached and taken away from the hull without permission, that is, theft may occur. There are various methods as outboard motor anti-theft measures (see Japanese Patent Laid-Open No. 2011-122331). However, it can be required to implement the outboard motor anti-theft measures relatively easily while suppressing an increase in cost.

SUMMARY OF THE INVENTION

The present invention provides a technique capable of preventing theft of an outboard motor relatively easily.

One of the aspects of the present invention provides an anti-theft apparatus for an outboard motor that can be mounted on a boat, comprising a comparison unit configured to compare a vibration of the outboard motor with a vibration of a portion of the boat other than the outboard motor, and a notification unit configured to make a predetermined notification based on a comparison result by the comparison unit.

Further features of the present invention will become apparent from the following description of exemplary embodiments with reference to the attached drawings.

DESCRIPTION OF THE EMBODIMENTS

Figure 1:
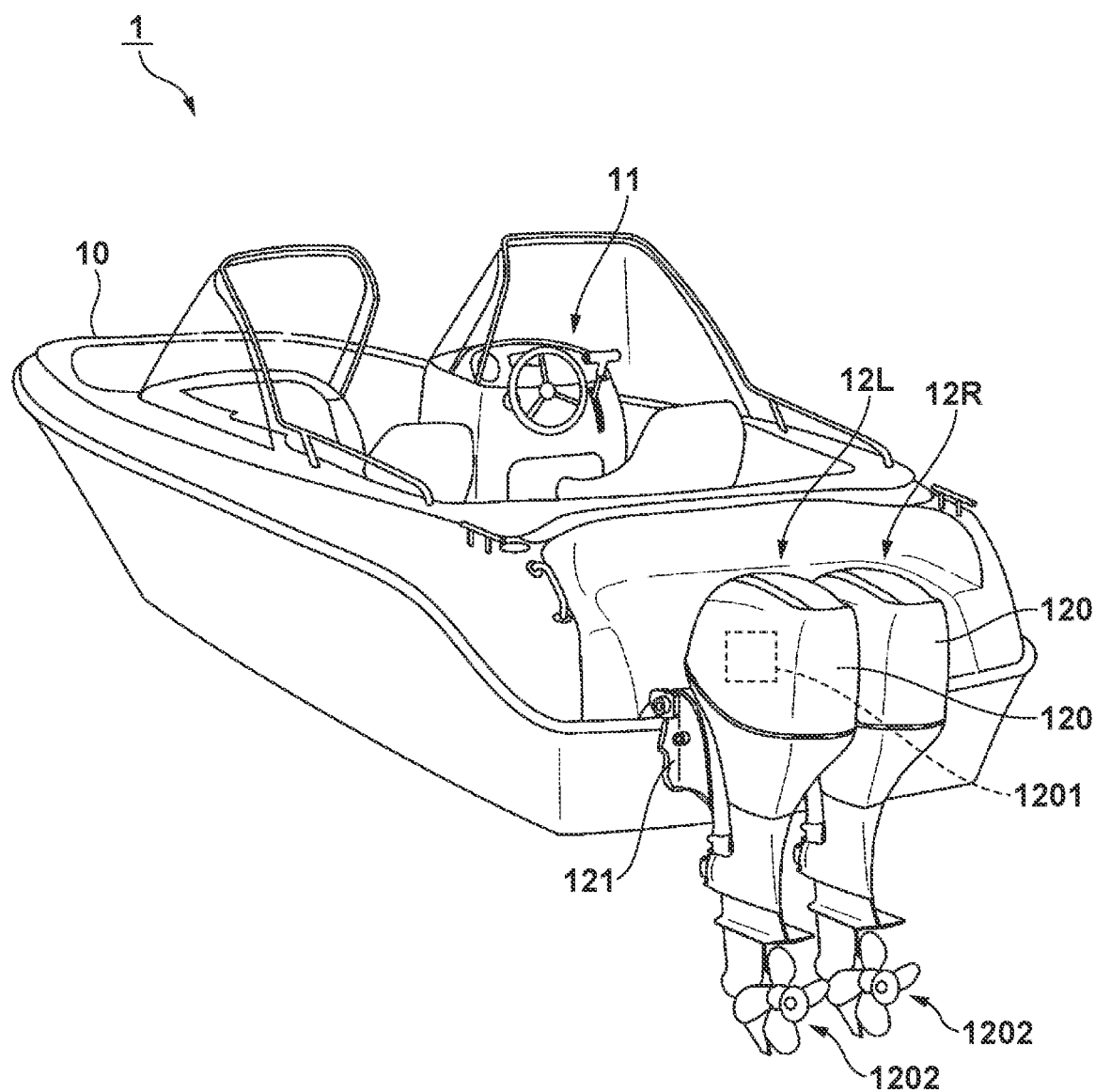
FIG. 1 is a perspective view for explaining an example of the arrangement of a boat.

Embodiments of the present invention will be described below with reference to the accompanying drawings. Note that the drawings are merely schematic views showing the structures or arrangements of the embodiments, and the dimensions of members shown in the drawings do not necessarily reflect the actuality. In addition, the same reference numerals denote similar members or components throughout the drawings, and a description of repetitive contents will be omitted.

First Embodiment

FIG. 1 is a rear perspective view of a boat 1 according to the first embodiment. In the following description, expressions such as front/rear, left/right (lateral), and upper/lower represent relative positional relationships with reference to a hull. The boat 1 includes, in the front portion of a hull 10, an operation unit 11 used by a pilot to perform an operation or steering operation, and further includes a pair of left and right outboard motors 12L and 12R attached to the rear portion of the hull 10. The left outboard motor 12L and the right outboard motor 12R are discriminated from each other. In the following description, however, when these outboard motors need not be discriminated from each other, they can simply be expressed as outboard motors 12.

Figure 2:
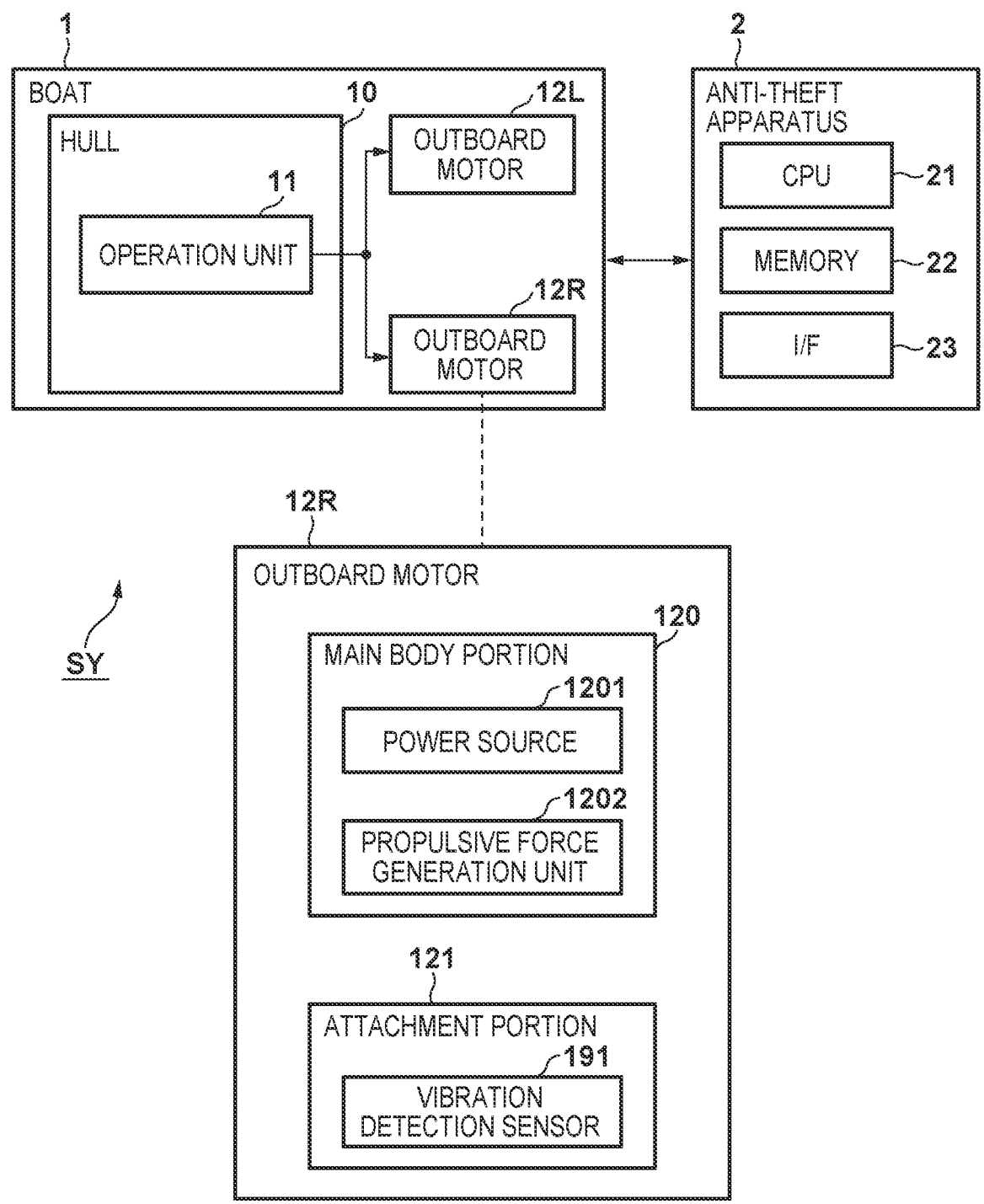
FIG. 2 is a block diagram for explaining an example of the arrangement of an anti-theft system.

FIG. 2 is a block diagram showing an example of the arrangement of the boat 1 and the outboard motor 12. FIG. 2 exemplifies the outboard motor 12R but each of the outboard motors 12L and 12R includes a main body portion 120 and an attachment portion 121. The main body portion 120 includes a power source 1201 and a propulsive force generation unit 1202. The power source 1201 is incorporated in the main body portion 120, and is implemented by an internal combustion engine (engine) in this embodiment. As another embodiment, an electric motor such as a three-phase induction motor may be used. For the propulsive force generation unit 1202, for example, a propeller is used. The propulsive force generation unit 1202 rotates by receiving the power of the power source 1201, thereby generating a propulsive force.

The attachment portion 121 is a coupling mechanism for attaching the main body portion 120 to the hull 10. The attachment portion 121 is configured to be pivotal with respect to the main body portion 120, that is, the relative position between the main body portion 120 and the attachment portion 121 is variable. This allows the main body portion 120 attached to the hull 10 via the attachment portion 121 to change its orientation with respect to the hull 10 or the attachment portion 121, thereby making it possible to change/adjust the direction of the propulsive force applied to the hull 10.

Although not shown, a connecting mechanism for connecting the main body portion 120 and the attachment portion 121 to be pivotal is provided between the main body portion 120 and the attachment portion 121, and an electric motor for implementing the pivot operation is incorporated in the connecting mechanism. The orientation of the main body portion 120 can be changed by controlling driving of this electric motor. In this embodiment, the main body portion 120 can pivot (turn) in either the vertical direction or the horizontal direction with respect to the hull 10. This outboard motor 12 is driven based on an operation input to the operation unit 11 by the pilot. Therefore, the pilot can steer the boat 1 by generating a desired propulsive force in a desired direction.

Note that a pivot in the upper direction of the main body portion 120 (a pivot in a direction to move away from the hull 10) can also be expressed as a tilt, and a pivot in the lower direction (a pivot in a direction to move closer to the hull 10) can also be expressed as a trim. The pivot angles can also be expressed as tilt/trim angles.

In this embodiment, a vibration detection sensor 191 is installed in the attachment portion 121, and can detect a vibration applied to the outboard motor 12. A communication unit or transmission/reception unit (not shown) is provided in the vibration detection sensor 191. This arrangement allows the boat 1 to communicate with an anti-theft apparatus 2, as shown in FIG. 2.

The anti-theft apparatus 2 is an apparatus for preventing theft of the outboard motor 12. In this embodiment, the anti-theft apparatus 2 is a server including a central processing unit (CPU) 21, a memory 22, and an external communication interface 23. The anti-theft apparatus 2 is installed away from the boat 1, and can be installed in, for example, the house of the user (who is mainly the owner of the boat 1 but who may temporarily rent the boat 1) of the boat 1. This arrangement allows the boat 1 and the anti-theft apparatus 2 to communicate with each other via a predetermined network, thereby forming an outboard motor anti-theft system (or simply an anti-theft system) SY.

Figure 3:
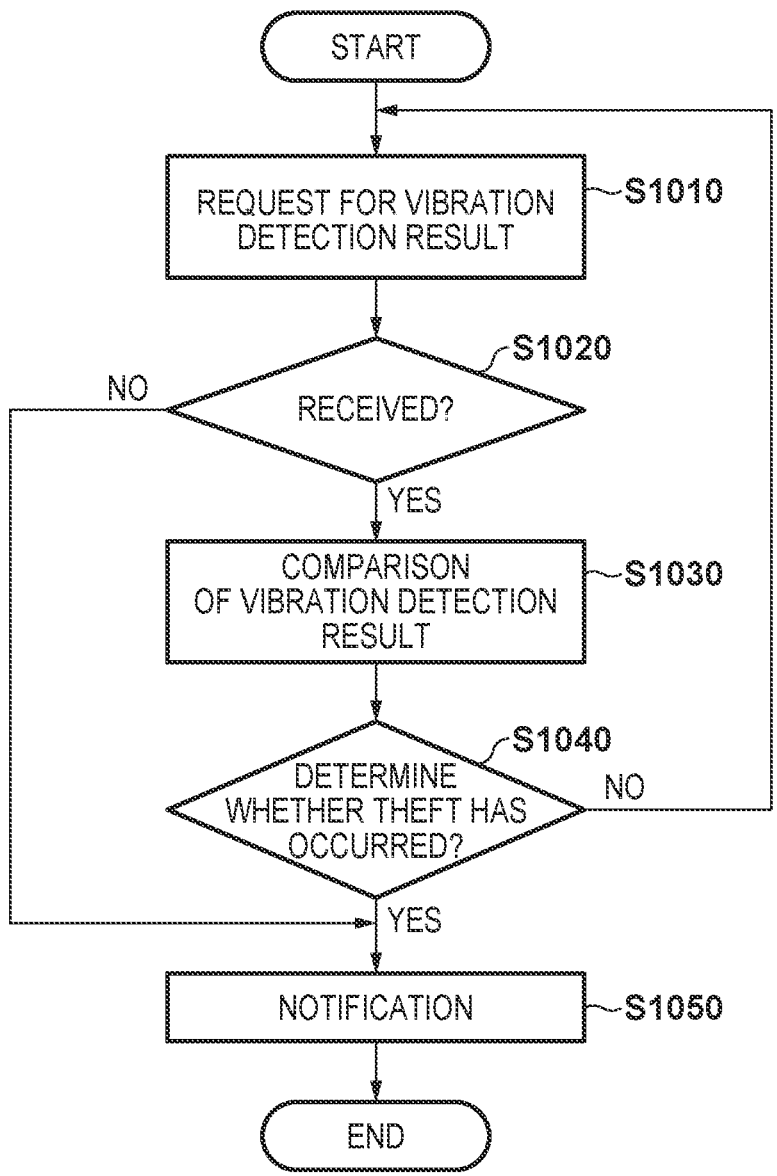
FIG. 3 is a flowchart for explaining an example of the operation contents of an anti-theft apparatus.

FIG. 3 is a flowchart for explaining the operation contents or processing contents of the anti-theft apparatus 2 in the system SY. Assume that steps to be described here are executed mainly by the CPU 21 and the memory 22 in the anti-theft apparatus 2. Note that the flowchart is typically started by an operation input by the user. For example, the flowchart can be started in response to setting of an anti-theft mode (warning mode) with respect to the boat 1 in a stop state.

In step S1010 (to be simply referred to as "S1010" hereinafter, the same applies to other steps), a vibration detection result transmission request is issued to the vibration detection sensor 191 of each outboard motor 12 of the boat 1. In response to reception of the request, each vibration detection sensor 191 transmits the vibration detection result to the anti-theft apparatus 2. In S1020, it is determined whether the vibration detection results have been received. If the vibration detection results have been received, the process advances to S1030; otherwise, the process advances to S1050.

In S1030, the vibration detection results obtained in S1020 are compared with each other, that is, the vibration detection result by the vibration detection sensor 191 of the outboard motor 12L and that by the vibration detection sensor 191 of the outboard motor 12R are compared with each other. In S1040, based on the comparison result obtained in S1030, the presence/absence of the occurrence of theft of the outboard motor 12L and/or the outboard motor 12R is determined. If it is determined that theft has occurred, the process advances to S1050; otherwise, the process returns to S1010.

The vibration detection result by each vibration detection sensor 191 is typically an electrical signal indicating the amount and period of a vibration caused by sea waves, and this signal is represented as a vibration detection signal (or simply a detection signal). The boat 1 can be maintained in a state in which it is stopped on the sea while it is not used by the user. Therefore, each vibration detection sensor 191 is configured to detect a vibration caused by sea waves. In other words, each vibration detection sensor 191 is configured to detect at least a vibration in the vertical direction. In this embodiment, since each vibration detection sensor 191 is installed in each outboard motor 12, it detects a vertical movement of the outboard motor 12 along with sea waves, and generates, as a vibration detection signal, an electrical signal indicating the detection result.

The comparison processing in S1030 is performed by analyzing the vibration detection signals from the vibration detection sensors 191. In S1040, based on the comparison result obtained in S1030, it is determined whether a difference between the two vibration modes of the outboard motors 12L and 12R is equal to or larger than a reference. For example, S1030 can be performed by specifying the matching and difference between the waveforms of the two vibration detection signals obtained from the vibration detection sensors 191 of the outboard motors 12L and 12R. For this specifying operation, a known matching method using spectral analysis may be used. In addition to/instead of this method, another matching arithmetic model may be used. If, for example, the difference between the amplitude quantities ([V]) of the above two vibration detection signals and/or the difference between the frequencies ([Hz]) of the two vibration detection signals or a phase difference is equal to or larger than a predetermined value, it can be determined in S1040 that the difference between the two vibration modes is equal to or larger than the reference. In this way, if the difference between the two vibration modes of the outboard motors 12L and 12R is equal to or larger than the reference, it is determined that theft has occurred and the process advances to S1050; otherwise, the process returns to S1010.

Since it is determined in S1040 that the difference in vibration mode equal to or larger than the reference has been generated between the outboard motors 12L and 12R, or it is determined in S1020 that no vibration detection results have been received, it is determined that theft has occurred and a predetermined notification is made in S1050. As typical examples of a method of making the notification, a notification (for example, mail) that theft has occurred is transmitted to the mobile terminal of the user of the boat 1, and a warning sound is generated. This allows the user of the boat 1 to quickly confirm the state of the boat 1.

As another method of making the notification, another method may additionally or alternatively be adopted. For example, a sound generation unit may additionally be provided in each outboard motor 12, and the anti-theft apparatus 2 may transmit, to each outboard motor 12, a signal for activating the sound generation unit. This makes it possible to directly warn a theft person and widely notify people around him/her.

If no theft has occurred, the process returns from S1040 to S1010. S1010 to S1040 are performed in a predetermined cycle, for example, every few seconds or every few minutes. In other words, S1010 (vibration detection result request) is performed in a predetermined cycle. Furthermore, in S1020, the vibration detection result transmitted from each vibration detection sensor 191 to the anti-theft apparatus 2 may be a vibration detection signal for the entire period of one cycle or a vibration detection signal for part of the period.

The above-described steps are assumed to be implemented when mainly the CPU 21 executes predetermined programs in the anti-theft apparatus 2. As another embodiment, however, the steps may be implemented by a semiconductor apparatus such as an ASIC (Application-Specific Integrated Circuit). That is, the function of the anti-theft apparatus 2 described in this specification can be implemented by either hardware or software. In this example, the anti-theft apparatus 2 is an apparatus whose main purpose is the anti-theft function with respect to the outboard motors 12L and 12R that can be mounted on the boat 1. However, an apparatus that auxiliarily has the function may be adopted.

The above-described anti-theft apparatus 2 receives the vibration detection signals as the vibration detection results concerning the outboard motors 12L and 12R from the vibration detection sensors 191 installed in the outboard motors 12L and 12R, and compares the vibrations based on the vibration detection signals (S1030). After that, if a difference equal to or larger than the reference is generated between the vibration modes, the anti-theft apparatus 2 determines that theft of the outboard motor 12L and/or the outboard motor 12R has occurred (S1040), and makes a predetermined notification based on the comparison result obtained in S1030 (S1050). Therefore, according to this embodiment, it is possible to prevent theft of the outboard motors 12L and 12R relatively easily. According to this embodiment, since it is not necessary to provide a GPS (Global Positioning System) sensor in the outboard motor 12L or 12R, the anti-theft function can be implemented at a relatively low cost.

Furthermore, in this embodiment, the vibration detection sensor 191 is installed in the attachment portion 121 of the outboard motor 12. The attachment portion 121 is fixed to the hull 10, and the positional relationship between the attachment portion 121 and the hull 10 substantially remains the same. Therefore, the vibration detection result by the vibration detection sensor 191 installed in the attachment portion 121 does not substantially receive the influence of the orientation of the main body portion 120. That is, a desired vibration detection result can be obtained regardless of the degree of a pivot of the main body portion 120 in the vertical direction and/or horizontal direction. Therefore, according to this embodiment, the above-described anti-theft function can be implemented appropriately regardless of the relative positional relationship between the attachment portion 121 and the main body portion 120.

Note that a case in which the boat 1 includes the two outboard motors 12 has been explained. The contents of this embodiment are the same even in a case in which three or more outboard motors 12 are provided. That is, the determination processing in S1040 is performed based on the difference between at least two vibration modes.

Second Embodiment

Figure 4:
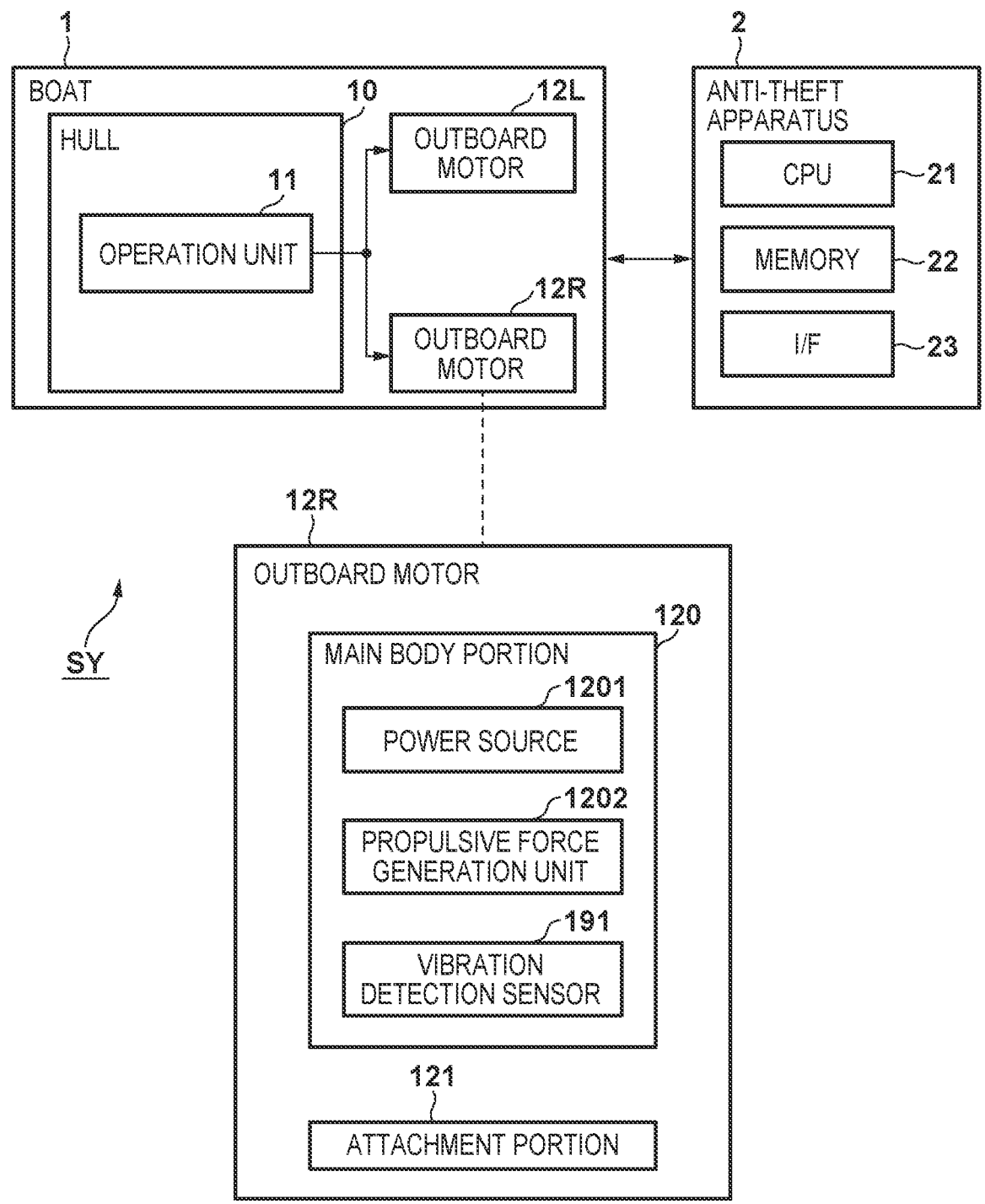
FIG. 4 is a block diagram for explaining an example of the arrangement of an anti-theft system.

In the above-described first embodiment, the influence of the orientation of the main body portion 120 on the vibration detection result is suppressed by installing the vibration detection sensor 191 in the attachment portion 121 of the outboard motor 12. However, the installation position of the vibration detection sensor 191 is not limited to the attachment portion 121. FIG. 4 shows an example of the arrangement of a boat 1 and outboard motors 12 according to the second embodiment. This embodiment is different from the first embodiment in that a vibration detection sensor 191 is installed in a main body portion 120.

As described above, the main body portion 120 and an attachment portion 121 are connected to be pivotal, and the main body portion 120 can change its orientation with respect to a hull 10. The vibration detection sensor 191 detects the vertical movement of the outboard motor 12 along with sea waves, and generates a vibration detection signal as an electrical signal indicating the detection result. Therefore, in this embodiment in which the vibration detection sensor 191 is installed in the main body portion 120, the vibration detection signal may vary depending on the orientation of the main body portion 120.

Figure 5A:
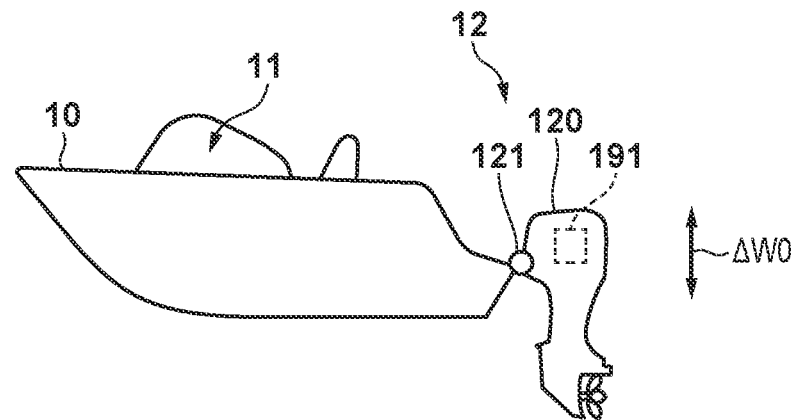
FIG. 5A is a view for explaining an example of an evaluation method for the occurrence of theft.
Figure 5B:
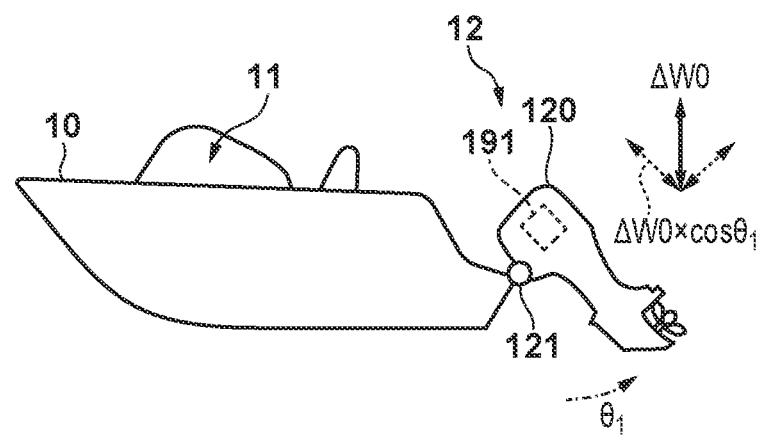
FIG. 5B is a view for explaining the example of the evaluation method for the occurrence of theft.
Figure 5C:
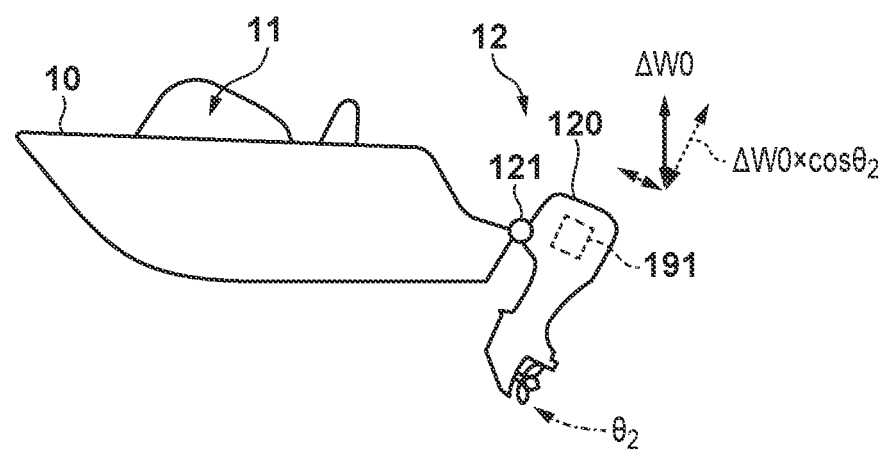
FIG. 5C is a view for explaining the example of the evaluation method for the occurrence of theft.

FIGS. 5A to 5C are schematic views for explaining examples of the vibration detection signal of the vibration detection sensor 191 in some different orientations of the main body portion 120. FIG. 5A shows an example when the main body portion 120 is in a standard orientation (an orientation in which the direction of a propulsive force is the horizontal direction). FIG. 5B shows an example when the main body portion 120 pivots in an upper direction (in a direction to move away from the hull 10). FIG. 5C shows an example when the main body portion 120 pivots in a lower direction (in a direction to move closer to the hull 10).

As for a pivot angle $\theta$ of the main body portion 120, $\theta=0°$ is set in the example shown in FIG. 5A, $\theta=\theta_1$ ($\neq 0°$) is set in the example shown in FIG. 5B, and $\theta=\theta_2$ ($\neq 0°$) is set in the example shown in FIG. 5C. If the vibration detection sensor 191 detects a vibration $\Delta W0$ of the outboard motor 12 in the example shown in FIG. 5A, the vibration detection sensor 191 detects $\Delta W0 \times \cos\theta_1$ in the case of the orientation in the example shown in FIG. 5B. Similarly, in the case of the orientation in the example shown in FIG. 5C, the vibration detection sensor 191 detects $\Delta W0 \times \cos\theta_2$.

That is, the vibration detection signal of the vibration detection sensor 191 varies depending on the orientation of the main body portion 120. In this case, the vibration detection signal is corrected based on the orientation of the main body portion 120. In this embodiment, in S1020, the anti-theft apparatus 2 receives the vibration detection signal of each vibration detection sensor 191 as the above-described vibration detection result from the outboard motor 12, and also receives, as a correction signal, a signal indicating the orientation of the corresponding main body portion 120. This allows the anti-theft apparatus 2 to correct the vibration detection signals appropriately in S1030 (comparison of the vibration detection results). That is, each vibration detection result obtained in S1020 is corrected based on the relative positional relationship between the attachment portion 121 and the main body portion 120.

Note that the correction signal can be acquired by a pivot angle detection sensor (not shown) that is provided in a connecting mechanism for connecting the main body portion 120 and the attachment portion 121 to be pivotal and can detect the pivot angle of the main body portion 120 and the attachment portion 121.

In this embodiment, the vibration detection sensor 191 is installed in the main body portion 120 of the outboard motor 12, and the anti-theft apparatus 2 corrects, in S1030, each detection result obtained in S1020 based on the relative positional relationship between the attachment portion 121 and the main body portion 120. In this form, it is possible to appropriately implement the same effect as in the first embodiment regardless of the installation position of each vibration detection sensor 191 in the outboard motor 12.

In this embodiment, each vibration detection sensor 191 detects a vibration in one direction (vertical direction). However, in another embodiment, each vibration detection sensor 191 may be able to detect a vibration in a three-dimensional coordinate system/spatial coordinate system. In this case, as the above-described correction processing, the vibration detection result by each vibration detection sensor 191 undergoes coordinate transformation based on the orientation of the main body portion 120 (the relative positional relationship between the attachment portion 121 and the main body portion 120).

In still another embodiment, the above-described correction processing may be implemented in the outboard motor 12. This can be implemented when a processor that can be provided in the main body portion 120 corrects, based on the signal received from the pivot angle detection sensor that can detect the pivot angle of the main body portion 120 and the attachment portion 121, the signal received from the vibration detection sensor 191.

Third Embodiment

Figure 6:
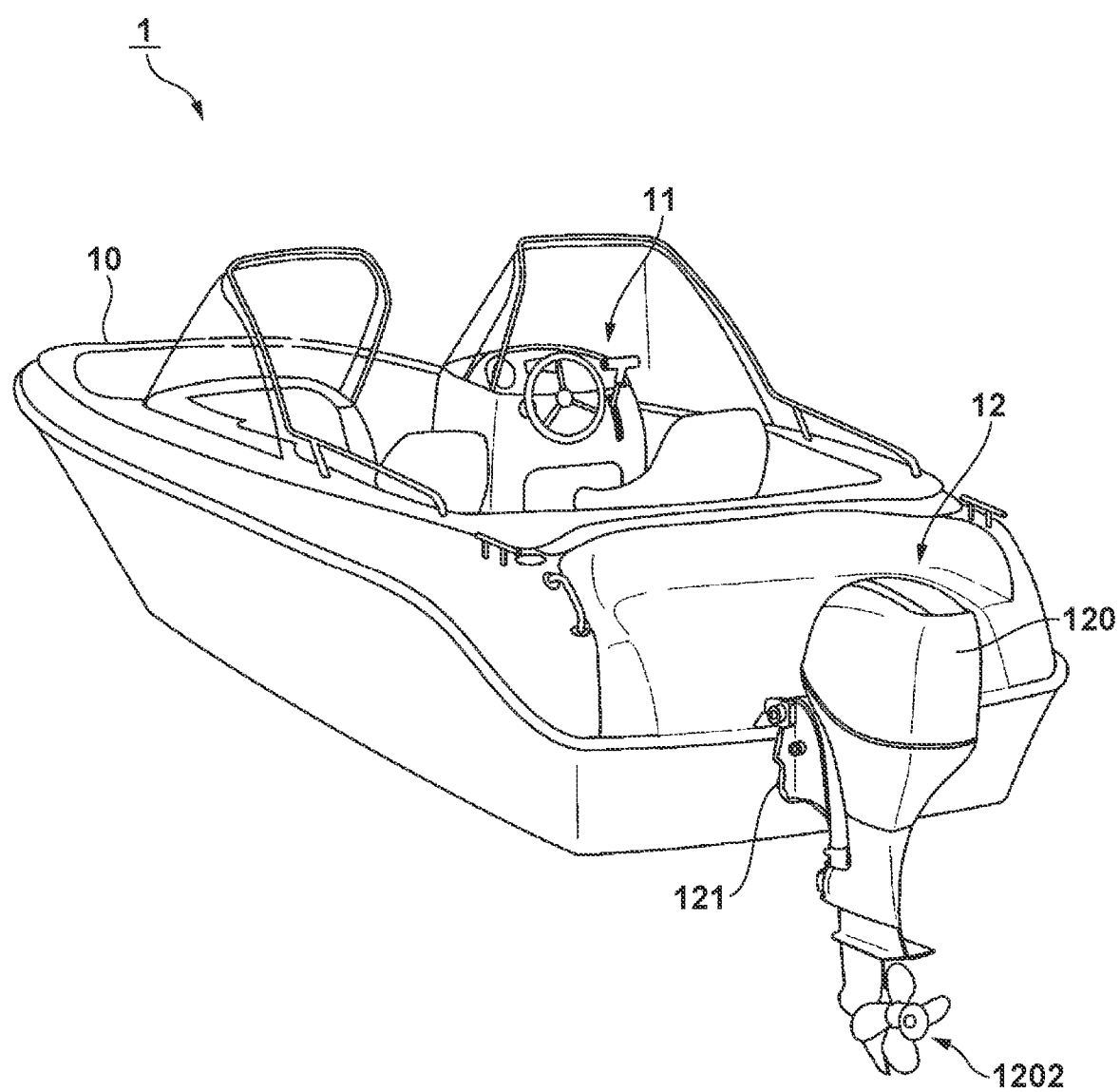
FIG. 6 is a perspective view for explaining an example of the arrangement of a boat.
Figure 7:
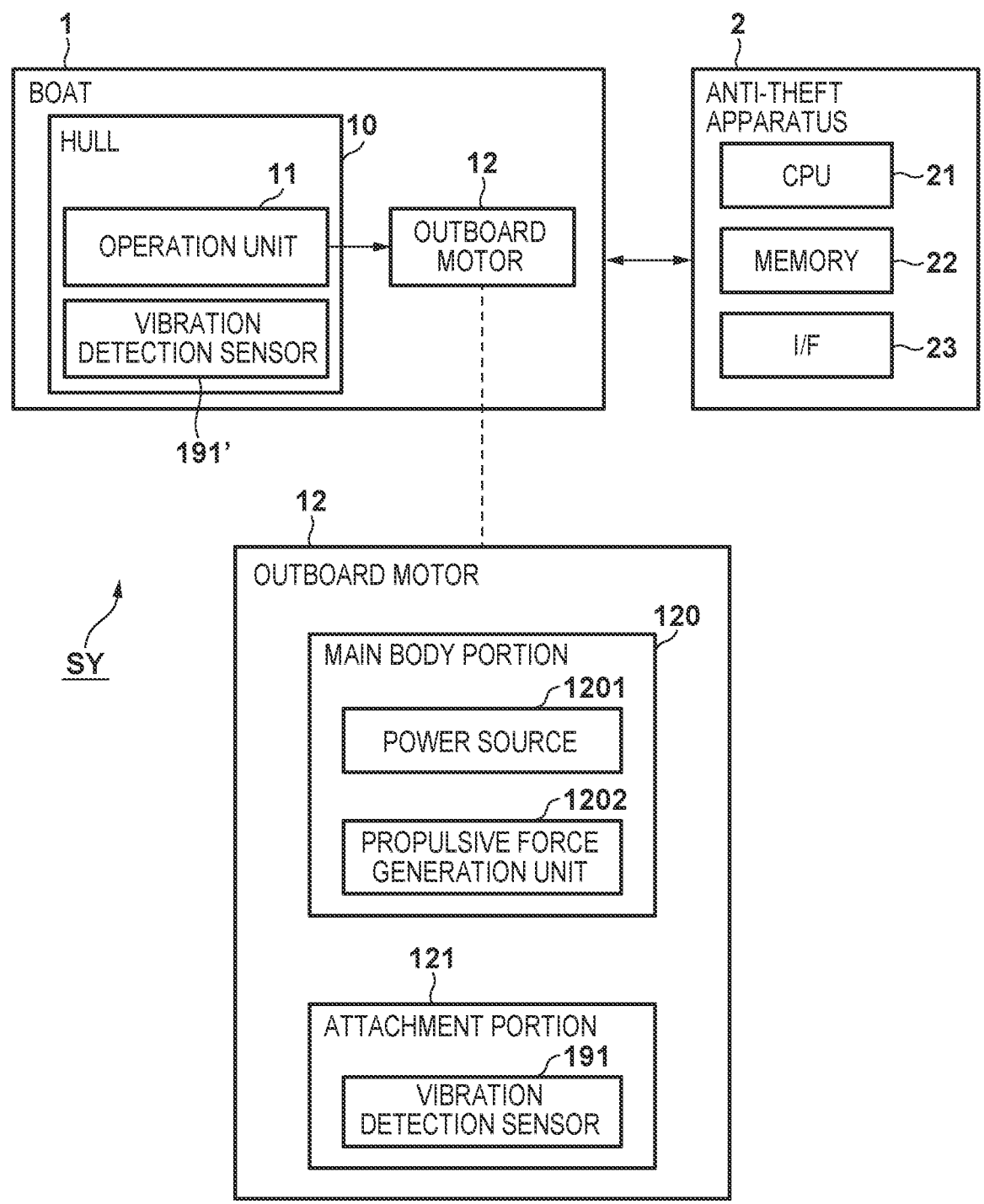
FIG. 7 is a block diagram for explaining an example of the arrangement of an anti-theft system.

Each of the above first and second embodiments has described the arrangement including the two (or two or more) outboard motors 12. The number of outboard motors 12 may be one. FIG. 6 shows a rear perspective view of a boat 1 according to the third embodiment. FIG. 7 shows an example of the arrangement of the boat 1 and an outboard motor 12. This embodiment is different from the first embodiment in that the boat 1 includes the single outboard motor 12 and one (to be referred to as a vibration detection sensor 191' hereinafter to be discriminated) of vibration detection sensors 191 is installed in a main body portion 120.

The determination processing in S1040 (see FIG. 3) described with reference to FIG. 3 is performed based on the difference between at least two vibration modes. Therefore, one vibration detection sensor 191 is installed in the outboard motor 12 as a protection target while the other vibration detection sensor 191' to be used as a comparison target may be installed in any portion of a hull 10. That is, in this embodiment, in S1030, an anti-theft apparatus 2 compares the vibration of the outboard motor 12 with the vibration of a portion of the boat 1 other than the outboard motor 12. Note that from the viewpoints of the above-described first and second embodiments, the portion (the portion other than the outboard motor 12) corresponds to the other outboard motor 12.

As is apparent from FIG. 7, in this embodiment, while the vibration detection sensor 191 is installed in an attachment portion 121 of the outboard motor 12, the other vibration detection sensor 191' is installed in the hull 10. In this arrangement, the anti-theft apparatus 2 can perform S1030 and S1040 in the same procedure as in the first embodiment using two vibration detection signals obtained from the vibration detection sensors 191 and 191'. Therefore, the anti-theft apparatus 2 can determine the presence/absence of theft of the single outboard motor 12 in S1050.

If the vibration detection sensor 191' is installed in the hull 10, the vibration detection signal of the vibration detection sensor 191' may vary depending on the portion of the hull 10 where the vibration detection sensor 191' is installed.

Figure 8A:
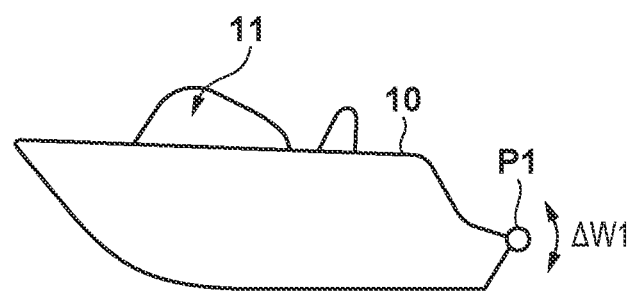
FIG. 8A is a view for explaining an example of an evaluation method for the occurrence of theft.
Figure 8B:
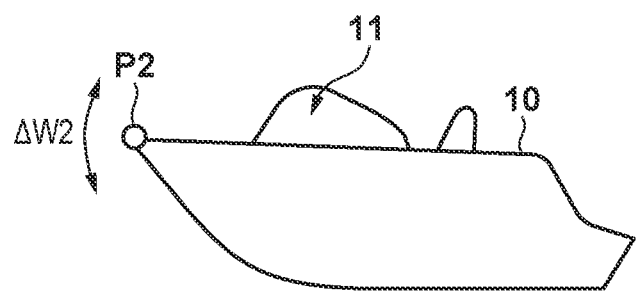
FIG. 8B is a view for explaining the example of the evaluation method for the occurrence of theft.
Figure 8C:
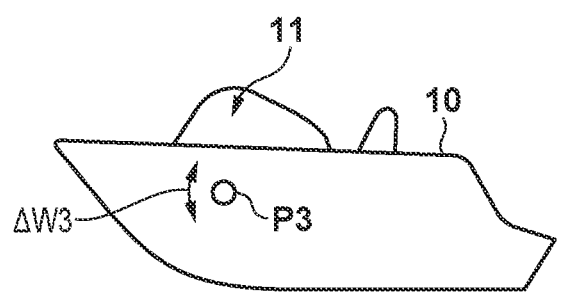
FIG. 8C is a view for explaining the example of the evaluation method for the occurrence of theft.

FIGS. 8A to 8C are schematic views for explaining examples of the vibration detection signal of the vibration detection sensor 191' in some cases in which the vibration detection sensor 191' is installed at different positions in the hull 10. FIG. 8A shows an example when the vibration detection sensor 191' is installed at a position P1 in the rear portion of the hull 10. FIG. 8B shows an example when the vibration detection sensor 191' is installed at a position P2 in the front portion of the hull 10. FIG. 8C shows an example when the vibration detection sensor 191' is installed at a position P3 in the central portion of the hull 10.

In general, in the hull 10 in the boat, if sea waves are relatively gentle, the entire hull 10 uniformly moves vertically in many cases (heaving). For example, a phase difference in vibration is hardly generated between one end portion and the other end portion of the hull 10.

On the other hand, if sea waves are relatively rough, a phase difference in vibration is readily generated between one end portion and the other end portion of the hull 10 (pitching/rolling), and its influence can mainly depend on the distance from the barycenter of the entire boat 1.

For example, if the barycenter and the position P3 (see FIG. 8C) substantially coincide with each other, rotation (in this example, pitching) about the barycenter position P3 is applied to the hull 10, and thus its influence is relatively small. On the other hand, at the position P1 or P2 (see FIG. 8A or 8B), the influence of rotation of the hull 10 about the position P3 is relatively large. Therefore, when vibrations $\Delta W1$, $\Delta W2$, and $\Delta W3$ represent vibrations detected by the vibration detection sensors 191 installed at the positions P1, P2, and P3, respectively, the relationships of $\Delta W1 > \Delta W3$ and $\Delta W2 > \Delta W3$ can be satisfied.

It can be said that the vibration detection signal of the vibration detection sensor 191' installed in the hull 10 can be corrected for each frequency component based on the installation position of the vibration detection sensor 191'. This can be implemented by, for example, performing predetermined arithmetic processing such as weighted addition including spectral analysis for the vibration detection signal obtained from the vibration detection sensor 191'. In addition to/instead of this, another correction processing based on a known vibration model may be performed. For example, a relatively high-frequency component of the vibration detection signal of the vibration detection sensor 191' installed at the position P1 or P2 can be multiplied by a coefficient K1 ($0 < K1$). A relatively high-frequency component of the vibration detection signal of the vibration detection sensor 191' installed at the position P3 can be multiplied by a coefficient K2 ($K1 < K2$). On the other hand, a relatively low-frequency component of the vibration detection signal of the vibration detection sensor 191' installed at the position P1, P2, or P3 may be multiplied by a coefficient K3 ($0 < K3 < K1$) or correction processing need not be performed.

In the first and second embodiments, since the vibration detection sensors 191 are installed in the two outboard motors 12L and 12R, respectively, the influences of waves on the vibration detection sensors 191 are substantially equal to each other, and thus the above-described correction processing is substantially unnecessary. On the other hand, in this embodiment, while the vibration detection sensor 191 is installed in the outboard motor 12, the vibration detection sensor 191' is installed in a portion of the hull 10. Thus, the influences of waves on the vibration detection sensors 191 and 191' are different from each other. Therefore, the above-described correction processing is preferably performed for the vibration detection signal of the vibration detection sensor 191 installed in the outboard motor 12 in the same manner.

Note that the installation positions of the vibration detection sensors 191 and 191' with respect to the hull 10 (the barycenter thereof) are specified in advance and stored in a memory 22 of the anti-theft apparatus 2.

The above-described correction processing is performed by the anti-theft apparatus 2 in S1030 in this embodiment but may be performed by the outboard motor 12 as another embodiment. This can be implemented when, for example, the installation positions of the vibration detection sensors 191 and 191' are registered in advance, and a predetermined processor corrects the vibration detection signals received from the vibration detection sensors based on the installation positions of the vibration detection sensors.

In this embodiment, the boat 1 includes the single outboard motor 12 and the two vibration detection sensors 191 and 191'. One vibration detection sensor 191 is installed in the outboard motor 12, and the other vibration detection sensor 191' is installed in a portion of the hull 10. In this form as well, the anti-theft apparatus 2 can determine the presence/absence of the occurrence of theft of the single outboard motor 12. That is, the number of vibration detection sensors 191 (and 191') need only be two or more by including the vibration detection sensor installed in the outboard motor 12 as a protection target, and the installation positions of some of the vibration detection sensors need not be in the outboard motor 12.

Fourth Embodiment

In the above-described first and second embodiments, if the difference between the vibration modes of the two or more outboard motors 12 is equal to or larger than the reference, it is determined that theft of the outboard motor 12 has occurred. In the above-described third embodiment, if the difference between the vibration mode of the outboard motor 12 and that of the portion of the hull 10 is equal to or larger than the reference, it is determined that theft of the outboard motor 12 has occurred. However, the determination method is not limited to them. If, for example, regardless of the above-described difference in vibration mode, it can apparently be said that theft has occurred, the notification processing in S1050 is preferably, quickly performed without performing the comparison processing in S1030 (see FIG. 3).

As an example in which theft occurs even though the above-described difference in vibration mode is not equal to or larger than the reference, it may be considered that a boat 1 is carried out through land without permission. On the other hand, since the boat 1 can be maintained in a state in which it is stopped on the sea while it is not used by the user, if the vibration detection sensor 191 does not detect a vibration caused by sea waves, it can be said that theft has occurred. If, for example, the signal value of the vibration detection signal of the vibration detection sensor 191 falls outside an allowable range (a vibration amount different from the typical vibration amount of waves is detected), it can be said that theft has occurred. In addition/alternatively, if the period of the change of the signal value falls outside an allowable range (a vibration with a period different from the typical period of waves is detected), it can be said that theft has occurred.

Therefore, an anti-theft apparatus 2 can determine whether a position where the detection operation has been performed is located on land, that is, whether the boat 1 is located on land, by evaluating the vibration detection signal of the vibration detection sensor 191 in S1040. This determination processing is performed based on whether the signal value of the vibration detection signal and/or the period of the change of the signal value falls within the allowable range. In this embodiment, the anti-theft apparatus 2 can quickly detect the occurrence of the theft even if the above-described difference in vibration mode is not equal to or larger than the reference.

Furthermore, the boat 1 is often configured so that the user can acquire the position information of the boat 1 as measures against a boat distress, drifting, or the like. For example, a GPS sensor or the like can be provided in the hull 10. Therefore, in addition/alternatively, by acquiring the position information of the boat 1, the anti-theft apparatus 2 can determine, based on the position information and map information, whether the boat 1 is located on land. In this case as well, the anti-theft apparatus 2 can quickly detect the occurrence of the theft. Note that the map information may be stored in advance in a memory 22 or acquired via a network.

Modification

In the above-described first embodiment, the anti-theft apparatus 2 is a server installed away from the boat 1. However, the anti-theft apparatus 2 may be installed in the boat 1, for example, the hull 10 or the outboard motor 12. As an example, if the boat 1 includes a plurality of outboard motors 12, the anti-theft apparatus 2 may be installed in each outboard motor 12 integrally with the vibration detection sensor 191. In this case, the plurality of outboard motors 12 mutually monitor the presence/absence of the occurrence of theft. Note that if the anti-theft apparatus 2 is installed in the boat 1, as the method of making the notification in S1050 (see FIG. 3), generation of a warning sound in addition to sending of the notification to the mobile terminal of the user of the boat 1 is advantageous in preventing theft by directly warning a theft person.

Others

Although some preferred embodiments have been exemplified above, the present invention is not limited to them, and may be partially changed without departing from the scope of the present invention. For example, a certain embodiment may be combined with part of another embodiment in accordance with the object. In addition, terms indicating elements in this specification are merely used for the purpose of explaining the present invention, and the present invention is not limited to the strict meanings of the terms and can also incorporate their equivalents.

Summary of Embodiments

The first aspect concerns an anti-theft apparatus (for example, 2), and the anti-theft apparatus is an anti-theft apparatus for an outboard motor (for example, 12, 12L) that can be mounted on a boat (for example, 1), characterized by comprising comparison means (for example, 21, 22, S1030) for comparing a vibration of the outboard motor with a vibration of a portion (for example, 12R, 10) of the boat other than the outboard motor, and notification means (for example, 21, 22, S1050) for making a predetermined notification based on a comparison result by the comparison means. Thus, if a difference equal to or larger than a reference is generated between the two vibration modes, it can be determined that theft has occurred, thereby making it possible to prevent theft of the outboard motor relatively easily.

According to the second aspect, the anti-theft apparatus is characterized in that the boat includes at least two vibration detection sensors (for example, 191, 191') each configured to detect a vibration, a first vibration detection sensor as one of the at least two vibration detection sensors is installed in the outboard motor, and a second vibration detection sensor as the other one is installed in the portion of the boat, and the comparison means performs the comparison based on signals of the at least two vibration detection sensors. Thus, it is possible to appropriately implement the effect while the boat has a relatively simple arrangement.

According to the third aspect, the anti-theft apparatus is characterized in that the outboard motor is set as a first outboard motor (for example, 12L), and the boat further includes a second outboard motor (for example, 12R) different from the first outboard motor, and the second vibration detection sensor is installed in the second outboard motor as the portion. Thus, it is possible to appropriately implement the effect in the boat including two (or two or more) outboard motors.

According to the fourth aspect, the anti-theft apparatus is characterized by further comprising reception means (for example, 21, 22, 23, S1020) for receiving the signals from the at least two vibration detection sensors. This can install the anti-theft apparatus at a position away from the boat.

According to the fifth aspect, the anti-theft apparatus is characterized in that the anti-theft apparatus is installed in each of the at least two vibration detection sensors, and further comprises communication means (for example, 21, 22, 23, S1010, S1020) for performing mutual communication between the at least two vibration detection sensors. In this case, it is possible to mutually monitor the presence/absence of the occurrence of theft.

According to the sixth aspect, the anti-theft apparatus is characterized in that the outboard motor includes a main body portion (for example, 120) incorporating a power source (for example, 1201), and an attachment portion (for example, 121) configured to be pivotal with respect to the main body portion and to attach the main body portion to a hull, and the first vibration detection sensor is installed in the attachment portion. Thus, it is possible to appropriately implement the effect regardless of the relative positional relationship (the orientation of the main body portion with respect to the attachment portion) between the attachment portion and the main body portion.

According to the seventh aspect, the anti-theft apparatus is characterized in that the outboard motor includes a main body portion (for example, 120) incorporating a power source (for example, 1201), and an attachment portion (for example, 121) configured to be pivotal with respect to the main body portion and to attach the main body portion to a hull (for example, 10), the first vibration detection sensor is installed in the main body portion, and the anti-theft apparatus further comprises correction means (for example, 21, 22, S1030) for correcting, based on a relative positional relationship between the attachment portion and the main body portion, a detection result of the vibration of the outboard motor by the first vibration detection sensor. Thus, it is possible to appropriately implement the effect by correcting, in a case of an orientation in which the main body portion pivots (for example, if trim adjustment or tilt adjustment is performed), the detection result of the vibration based on the relative positional relationship between the attachment portion and the main body portion.

According to the eighth aspect, the anti-theft apparatus is characterized by further comprising second correction means (for example, 21, 22, S1030) for correcting, based on information indicating an installation position of each of the at least two vibration detection sensors, detection results by the at least two vibration detection sensors. The above-described detection result of the vibration varies depending on the installation position (for example, the distance from the barycenter of the hull) of the vibration detection sensor, and a difference in vibration amount or a phase difference may be generated. Thus, by performing correction processing in consideration of this, it is possible to appropriately determine the presence/absence of the occurrence of the theft.

According to the ninth aspect, the anti-theft apparatus is characterized by further comprising determination means (for example, 21, 22, S1040) for determining, based on the vibration of the outboard motor and the vibration of the portion, whether the boat is located on land, wherein if the determination means determines that the boat is located on land, the notification means makes the notification. Thus, even if a difference equal to or larger than the reference is not generated between the vibration modes, when a predetermined condition is satisfied, the notification is made.

According to the 10th aspect, the anti-theft apparatus is characterized by further comprising determination means (for example, 21, 22, S1040) for determining, based on position information of the boat and map information, whether the boat is located on land, wherein if the determination means determines that the boat is located on land, the notification means makes the notification. That is, if it can apparently be said that theft has occurred, the notification is made.

The 11th aspect concerns an outboard motor anti-theft system (for example, SY), and the outboard motor anti-theft system is an outboard motor anti-theft system comprising an outboard motor (for example, 12, 12L) that can be mounted on a boat (for example, 1) and an anti-theft apparatus (for example, 2) configured to communicate with the outboard motor, characterized in that the anti-theft apparatus comprises comparison means (for example, 21, 22, S1030) for comparing a vibration of the outboard motor with a vibration of a portion (for example, 12R, 10) of the boat other than the outboard motor, and notification means (for example, 21, 22, S1050) for making a predetermined notification based on a comparison result by the comparison means. Thus, if a difference equal to or larger than the reference is generated between the above-described vibration modes, it can be determined that theft has occurred, thereby making it possible to prevent theft of the outboard motor relatively easily.

The invention is not limited to the foregoing embodiments, and various variations/changes are possible within the spirit of the invention.

What is claimed is:

1. An anti-theft apparatus for an outboard motor that can be mounted on a boat, comprising:
   a comparison unit configured to compare a vibration of the outboard motor with a vibration of a portion of the boat other than the outboard motor; and
   a notification unit configured to make a predetermined notification based on a comparison result by the comparison unit.

2. The apparatus according to claim 1, wherein
   the boat includes at least two vibration detection sensors each configured to detect a vibration,
   a first vibration detection sensor as one of the at least two vibration detection sensors is installed in the outboard motor, and a second vibration detection sensor as the other one is installed in the portion of the boat, and
   the comparison unit performs the comparison based on signals of the at least two vibration detection sensors.

3. The apparatus according to claim 2, wherein
   the outboard motor is set as a first outboard motor, and the boat further includes a second outboard motor different from the first outboard motor, and
   the second vibration detection sensor is installed in the second outboard motor as the portion.

4. The apparatus according to claim 2, further comprising a reception unit configured to receive the signals from the at least two vibration detection sensors.

5. The apparatus according to claim 2, wherein
the anti-theft apparatus is installed in each of the at least two vibration detection sensors, and
further comprises a communication unit configured to perform mutual communication between the at least two vibration detection sensors.

6. The apparatus according to claim 2, wherein
the outboard motor includes
a main body portion incorporating a power source, and
an attachment portion configured to be pivotal with respect to the main body portion and to attach the main body portion to a hull, and
the first vibration detection sensor is installed in the attachment portion.

7. The apparatus according to claim 2, wherein
the outboard motor includes
a main body portion incorporating a power source, and
an attachment portion configured to be pivotal with respect to the main body portion and to attach the main body portion to a hull,
the first vibration detection sensor is installed in the main body portion, and
the anti-theft apparatus further comprises a correction unit configured to correct, based on a relative positional relationship between the attachment portion and the main body portion, a detection result of the vibration of the outboard motor by the first vibration detection sensor.

8. The apparatus according to claim 2, further comprising a second correction unit configured to correct, based on information indicating an installation position of each of the at least two vibration detection sensors, detection results by the at least two vibration detection sensors.

9. The apparatus according to claim 1, further comprising a determination unit configured to determine, based on the vibration of the outboard motor and the vibration of the portion, whether the boat is located on land,
wherein if the determination unit determines that the boat is located on land, the notification unit makes the notification.

10. The apparatus according to claim 1, further comprising a determination unit configured to determine, based on position information of the boat and map information, whether the boat is located on land,
wherein if the determination unit determines that the boat is located on land, the notification unit makes the notification.

11. An outboard motor anti-theft system comprising an outboard motor that can be mounted on a boat and an anti-theft apparatus configured to communicate with the outboard motor,
wherein the anti-theft apparatus comprises
a comparison unit configured to compare a vibration of the outboard motor with a vibration of a portion of the boat other than the outboard motor, and
a notification unit configured to make a predetermined notification based on a comparison result by the comparison unit.

* * * * *